UNITED STATES PATENT OFFICE.

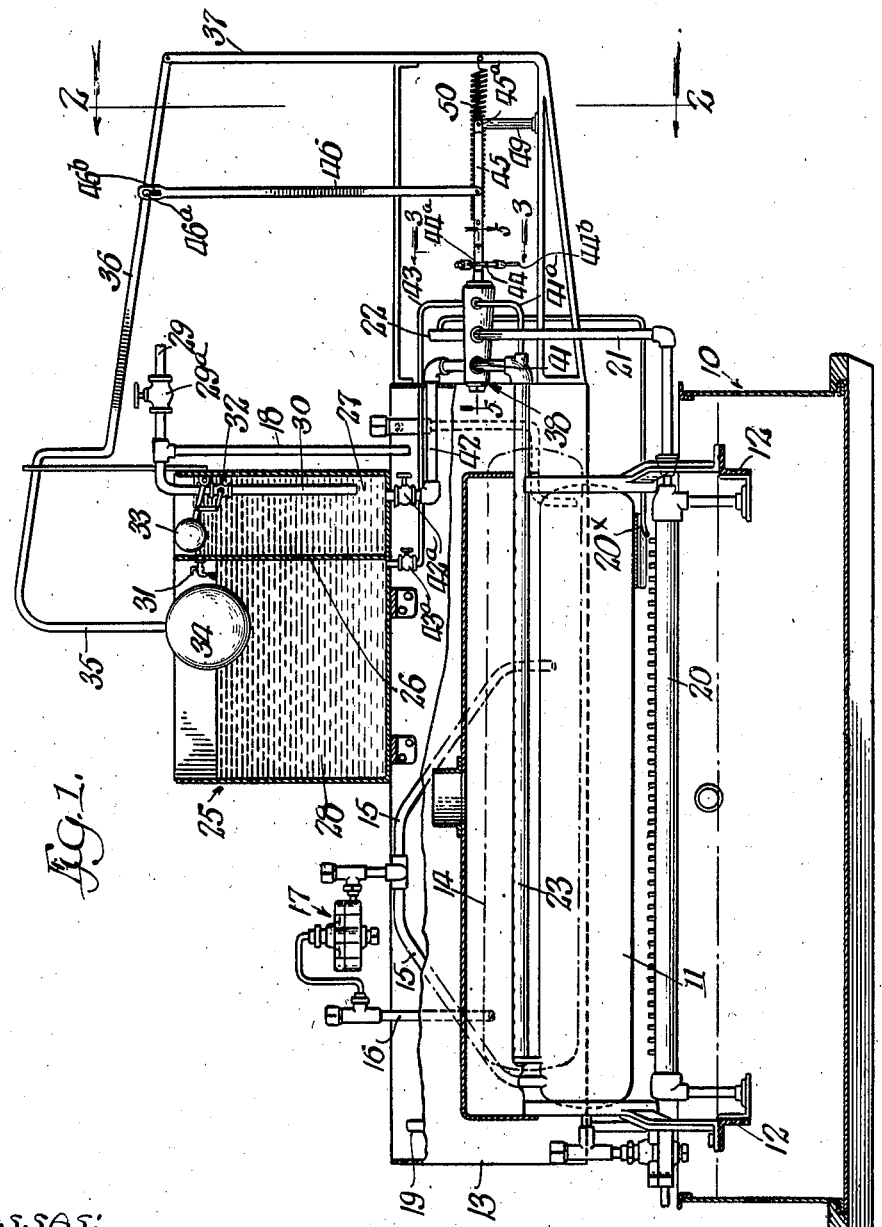

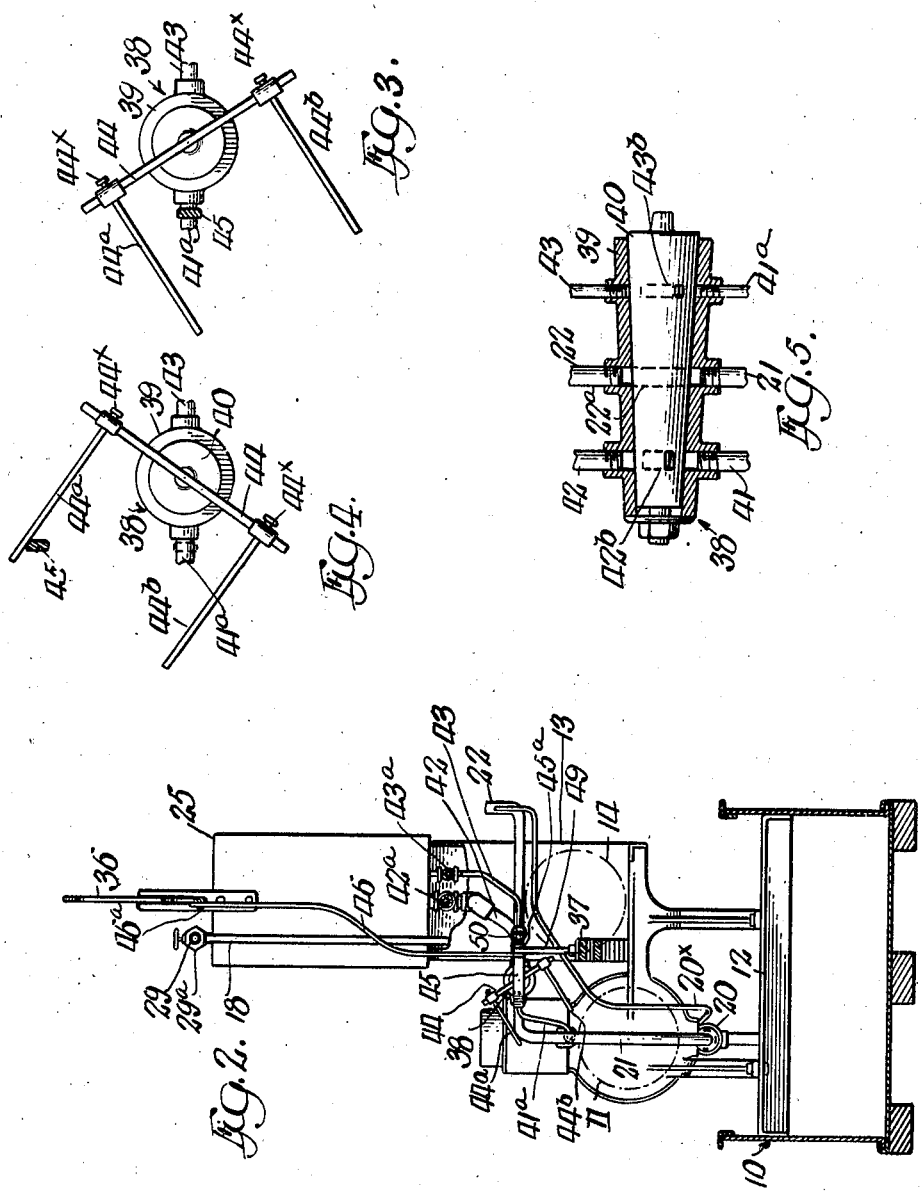

MALCOLM F. EWEN, OF CHICAGO, ILLINOIS, ASSIGNOR TO LARSEN ICE MACHINE COMPANY (INC.), OF WILMINGTON, DELAWARE, A CORPORATION OF DELAWARE.

REFRIGERATING APPARATUS.

1,190,225.     Specification of Letters Patent.     Patented July 4, 1916.

Application filed May 18, 1914. Serial No. 839,207.

*To all whom it may concern:*

Be it known that I, MALCOLM F. EWEN, a citizen of the United States, and a resident of Chicago, in the county of Cook and State of Illinois, have invented certain new and useful Improvements in Refrigerating Apparatus; and I do hereby declare that the following is a full, clear, and exact description thereof, reference being had to the accompanying drawings, and to the letters of reference marked thereon, which form a part of this specification.

This invention relates to improvements in refrigerating apparatus and consists of the matters hereinafter described and more particularly pointed out in the appended claims.

The invention relates particularly to refrigerating apparatus of the absorption type, in which is included a single drum or still that contains water for the absorption of the refrigerant and which is heated and cooled in alternate cycles in a familiar manner. In an apparatus of this kind, it is usual to include a brine tank in which the expansion coil is immersed, since, there being but one still, the generation of the liquid refrigerant is intermittent.

The object of the invention is to provide for controlling the periods of alternate generation and absorption in the still by means which are of simple and efficient construction and which have few parts so that there is no danger of them getting out of order.

In the drawings: Figure 1 is a view representing a vertical section through a refrigerating apparatus of the kind described provided with my improved means for controlling the alternate cooling and heating of the drum or still which acts in alternate cycles as a generator and as an absorber. Fig. 2 is a view representing a vertical section through Fig. 1 in a plane indicated by the line 2—2 of Fig. 1. Figs. 3 and 4 are views representing on an enlarged scale, partial vertical sections through Fig. 1 in a plane indicated by the line 3—3 thereof; Fig. 3, representing the parts in one position of their operation, and Fig. 4 representing a second position. Fig. 5 is a view representing on an enlarged scale a horizontal detail section through Fig. 1 in a plane indicated by the line 5—5 of Fig. 1.

Referring now to that embodiment of my invention illustrated in the drawings, 10 indicates a tank which constitutes the base of the apparatus and which is adapted to receive the cooling water discharged upon the still to cool it during the absorption cycle of the apparatus.

11 indicates the generator-absorber still or drum, the same being supported in a suitable manner on cross bars 12, 12 secured to the side walls of the tank 10.

13 indicates a second tank elevated above the level of the tank 10 and located back of the still or drum 11. In said tank is contained a drum 14 which constitutes the condenser of the apparatus. The still 11 is connected by suitable discharge pipes 15, 15 and 16 (see Fig. 1) with the condenser 14, there being interposed between the pipes 15, 15 and 16 the usual check valve 17. The pipes 15, as shown, are inclined upwardly from the still and extend into the tank 13, wherein they are immersed in water, so as to constitute rectifiers for the condensation of the moisture that is carried off with the generated refrigerant during the generation cycle of the apparatus. The tank 13 is supplied with water from a pipe 18 and has an overflow pipe 19 which discharges into the tank 10.

20 indicates a burner pipe located below and adapted to heat the still 11. Said burner pipe is supplied from a pipe 21 which is connected by valve mechanism, presently to be described, to a main gas supply pipe 22. Above the still 11 is located a water discharge pipe 23 which is adapted to supply water to cool the drum 11 during the absorption cycle of the apparatus.

The parts thus far described are familiar and form no part of the present invention.

Above the tank 13 there is located a tank 25. Said tank contains an upright partition 26 which divides it into two compartments, a small compartment or chamber 27 and a large compartment or chamber 28.

29 indicates a main water supply pipe in which is interposed a hand valve 29ª for controlling the flow of water therethrough. Said pipe has a discharge end 30 which depends into the water compartment 27 of the tank 25. The pipe 29 is also connected to the pipe 18 which supplies water to the tank 13 for cooling the condenser 14.

31 indicates a water cock fixed in the partition wall 26 of the tank 25 and adapted to discharge water from the compartment 27 into the compartment 28 when the level of the water in the compartment 27 rises to a level with said water cock. The flow from the one compartment to the other may be controlled or predetermined by said water cock 31.

In the discharge pipe 30 there is placed a valve 32 which is adapted to be operated in a familiar manner by means of a float 33 located in the compartment 27. This valve and float are so arranged that the float will operate to close the valve when the water level in the compartment 28 rises slightly above the level of the water cock 31.

34 indicates a float in the compartment 28. Said float is attached to a depending arm 35 of a lever 36 that is fulcrumed to a bracket 37 fixed, as shown, to the tank 13.

The flow of water and gas in the operation of the apparatus is controlled by a main valve 38 (see Figs. 1 and 5). Said valve, as shown, comprises a casing 39 and a rotative, conical valve plug 40.

41 indicates an outlet pipe connected with the valve casing 39 and leading to the water pipe 23 that discharges water on the still during the absorption cycle of the apparatus. 41ª indicates an auxiliary outlet pipe of substantially smaller cross-sectional area which also connects the valve casing 39 with the discharge pipe 23. 42, 43 indicate inlet pipes associated with said pipes 41, 41ª respectively. The inlet pipe 43, being the one of smaller cross-sectional area, is connected to the bottom of the larger compartment 28 of the tank 25 while the inlet pipe 42, being the one of larger cross-sectional area, is connected to the bottom of the smaller compartment 27 of the tank 25 (see Fig. 1). Hand valves 42ª, 43ª are interposed in said pipes for use in case for any reason the water tank 25 is desired to be cut off entirely from the main valve 38, as when cleaning the apparatus.

The rotative plug 40 of the main controlling valve is provided with suitable ports 42ᵇ, 43ᵇ associated with the inlet pipes 42 and 43, respectively, and adapted to simultaneously connect said inlet pipes directly with the outlet pipes 41, 41ª, when the valve plug is rotated into one position.

The main gas supply pipe 22 and the pipe 21 leading to the burner 20 are connected to opposite sides of the valve casing 39 and the valve plug 40 is provided with a port 22ª to connect said two pipes when the valve plug is rotated into a second position different from that above referred to. The valve plug 40 has attached to it a diametrically extending bar 44, and adjustably mounted on said bar by means of set screws 44ˣ are parallel laterally spaced arms 44ª, 44ᵇ. Said arms may be moved toward and away from each other upon the bar 44 by loosening said set screws 44ˣ and tightening the same when the proper adjustment of said arms has been made. 45 indicates a lever adapted to coact with said arms 44ª, 44ᵇ to shift the valve plug. Said lever is connected by a link 46 to the lever 36 which carries the float 34 in the large compartment 28 of the tank 25. Said link is connected by a pin and slot 46ª, 46ᵇ so as to provide some lost motion between the link and lever 34. The lever 45 is fulcrumed at 45ª on an arm 49 fixed to the bracket 37 and a spring 50 is provided for positively swinging the lever 45 in one direction or the other after it has passed a dead center. The adjustment of the arms 44ª, 44ᵇ upon the bar 44 permits the said valve plug 40 to be rotated a sufficient amount by means of the lever 45 to insure proper opening and closing of the valve ports in said plug.

The operation of the apparatus is as follows:—In the drawings, as shown in Figs. 1, 2, 3 and 5, the parts of the apparatus appear shown in their relation as when the fuel gas is turned on, the burner 20 is burning to generate or drive off the ammonia gas from the still 11 to the condenser 14, and water is flowing through the discharge pipe 30 into the compartment 27 of the tank 25 and overflowing from said compartment through the cock or faucet 31 into the compartment 28 of said tank. The compartment 28 is filled almost up to the level of the cock 31 and the ball 33 is approaching that position which it is required to occupy in order to turn off the valve 32. In other words, the cycle of generation has almost reached its termination and the apparatus is nearly ready to begin its cycle of absorption. The level of the water in the compartment 28 of the tank 25 finally reaches the level of the water in the compartment 27 thereof, so that the further flow of water into the compartment 27 acts to lift the ball 33 so as to close the valve 32 and shut off completely the flow of water into compartment 27. At the same time the ball 34, by reason of its rise with the water in the compartment 28 of the tank 25 comes to such a position that it raises the lever 36 so as to shift the lever 45 beyond the dead center, whereupon the coiled spring 50 actuates said lever to swing the arm 44ª and with it the diametric bar 44 to rotate the valve plug 40 into the position shown in Fig. 4. The rotation of the valve plug 40 shuts off the connection between the main gas pipe 22 and the pipe 21 leading to the burner 20, thus shutting off the gas supply to the burner 20, and at the same time brings the water pipes 41, 41ᵃ, connected to the discharge pipe 23, into connection with the large pipe 42 connected with the compartment 27 of the tank 25 and the small pipe 43 connected with the compartment 28 of said tank.

As a result of the connection described, the water in the compartment 27 will rush with considerable velocity through the larger pipe 42 and its connecting pipe 41 to the water discharge pipe 23, so as to discharge in the first instance a comparatively large volume of water over the still 11 to cool it, and thus quickly rid it of the heat acquired during the process of generation. At the same time, the water will be flowing through the pipe 43 and its connected pipe 44ᵇ to the discharge pipe 23 from the larger compartment 28 of the tank 25, at a slower rate. Thus, after the discharge from the compartment 27, there will be a continued flow of cooling water from the compartment over the still to cool it during the absorption cycle. With the discharge of water from the compartment 27, the float 33 will descend and cause the valve 32 to be opened so as to again permit a flow of water from the main supply pipe 29 into the compartment 27. Thus, the compartment 27 will begin to fill almost immediately. The discharge of water from the compartment 28 will permit the gradual descent of the float 34 and with it the downward swing of the lever 36 and of the lever 45. The slot and pin connection of the link 46 with the lever 36 permits a certain amount of lost movement between the lever 36 and the lever 45 so that the float 34 will descend a considerable distance before it has any effect to move the lever 45 and the same in the reverse movement of said lever, as it is not intended for the valve plug 40 to be operated except at the extreme limits of the movement of the float 34. When, however, the float 34 approaches the bottom of the compartment 28, which will occur when the water in said compartment is substantially exhausted, the lever 45 will be shifted downwardly beyond the dead center and into engagement with the arm 44ᵇ fixed to the diametric bar 44 on the plug 40, whereupon the coiled spring 50 will actuate said lever to rotate the valve plug 40 into a position where the connection between the pipes 42, 43, respectively, and the pipes 41, 41ᵃ (for the water supply to the still) will be broken and the connection between the fuel gas pipes 21 and 22 will be restored; then the flow of fuel gas to burner 20 will begin again. The burner will then be lighted by a suitable continuously burning pilot light 20ˣ, which is supplied from the fuel gas pipe 22 from a point beyond the main controlling valve.

It will be apparent from the foregoing description that the cycles of generation and absorption are entirely controlled by the floats in the tank 25 and that the control is dependent merely upon the levels attained by the water in the two compartments of the tank 25. The operation of the apparatus is in no way dependent upon the seating of floats to close or open discharge valves, and the parts included in the mechanism for the control of the shifting of the cycles of the apparatus are simple in construction and arrangement and are positive and definite in operation.

While in describing one embodiment of my invention I have referred to certain details of construction and arrangement of parts, it is to be understood that the invention is in no way to be limited thereby except as may be pointed out in the appended claims.

I claim as my invention:

1. In a refrigerating apparatus, including a still and means for supplying cooling water to said still and means for heating said still in alternate cycles, means controlling the alternate application of heat and cooling water to said still, comprising a main controlling device, a tank, means for supplying a liquid to said tank, a float in said tank, and mechanism intermediate said float and said main controlling device adapted to shift said controlling device when the liquid in said tank reaches predetermined maximum and minimum levels in said tank.

2. In a refrigerating apparatus, including a still, a discharge pipe for supplying cooling water to said still and means for supplying a burner for heating said still in alternate cycles, a main controlling device adapted in one position to turn on said heating supply means and including a valve plug for controlling the flow of cooling water to cool said still, a tank containing two compartments, a smaller compartment and a larger compartment, means providing an overflow from the smaller compartment to the larger compartment at a predetermined level in the smaller compartment, an inlet pipe adapted to discharge cooling water into said smaller compartment, a float controlled valve in said inlet pipe adapted to close when the liquid in said smaller compartment rises to a predetermined level, a float in said larger compartment, a large conduit connecting said smaller compartment through said valve plug with said cooling water discharge pipe, a smaller conduit connecting said larger compartment through said main controlling valve to said cooling water discharge pipe, and means actuated by the float in the larger tank adapted for shifting said main controlling device at predetermined maximum and minimum levels of the water in said larger compartment.

In testimony that I claim the foregoing as my invention I affix my signature in the presence of two witnesses, this 1st day of May A. D. 1914.

MALCOLM F. EWEN.

Witnesses:
T. H. ALFREDS,
KAEL W. DOLL.